US006537078B2

(12) United States Patent
Jean

(10) Patent No.: US 6,537,078 B2
(45) Date of Patent: Mar. 25, 2003

(54) SYSTEM AND APPARATUS FOR A KARAOKE ENTERTAINMENT CENTER

(76) Inventor: Charles Jean, 558 Jefferson Ave., Elizabeth, NJ (US) 07201

(*) Notice: Subject to any disclaimer, the term of this patent is extended or adjusted under 35 U.S.C. 154(b) by 0 days.

(21) Appl. No.: 09/919,759

(22) Filed: Aug. 2, 2001

(65) Prior Publication Data

US 2003/0027120 A1 Feb. 6, 2003

(51) Int. Cl.[7] ............................ G09B 15/06; G09B 5/00
(52) U.S. Cl. .................................................. 434/307 A
(58) Field of Search ......................... 434/307 A, 307 R, 434/308, 309; 84/477 R, 601, 603, 610, 630, 645

(56) References Cited

U.S. PATENT DOCUMENTS

| | | | | |
|---|---|---|---|---|
| 5,464,946 A | * | 11/1995 | Lewis | 84/477 R |
| 5,481,509 A | * | 1/1996 | Knowles | 369/30.03 |
| 5,691,494 A | * | 11/1997 | Sai et al. | 434/307 A |
| 5,833,469 A | * | 11/1998 | Ito et al. | 434/307 A |
| 5,947,746 A | * | 9/1999 | Tsai | 434/307 A |
| 6,074,215 A | * | 6/2000 | Tsurumi | 434/307 A |

FOREIGN PATENT DOCUMENTS

| | | | | |
|---|---|---|---|---|
| JP | 9-34478 A | * | 2/1997 | G06F/13/00 |
| JP | 11-133988 A | * | 5/1999 | G10K/15/04 |
| JP | 11-184485 A | * | 7/1999 | G06F/13/00 |
| JP | 2000-66688 A | * | 3/2000 | G01K/15/04 |

* cited by examiner

*Primary Examiner*—Hieu T. Vo
(74) *Attorney, Agent, or Firm*—Ezra Sutton

(57) ABSTRACT

An entertainment system for storing, transmitting and displaying music, pictures and sound from videos and audios in any format for users to sing or act along with. The entertainment system includes an entertainment center having a central computer and server, a hardswitch connected to the central computer and server, and a converter connected to the hardswitch; and at least one user sub-station location having a plurality of individual karaoke player rooms. The entertainment system also includes a remote library source of videos/audios on any format having T1 bandwidth lines for transmitting to the entertainment center; and the entertainment center also having T1 bandwidth lines for transmitting to at least one of the user sub-station locations. The converter includes a karaoke video disc player for converting the received audio/video into a desired karaoke formatted song, play or movie. Each of the karaoke player rooms includes a workstation for selecting the desired karaoke formatted song, play or movie, a viewing monitor for displaying the selected videos/audios in the converted karaoke formatted songs, play or movie, a karaoke microphone for the user to sing or act into, and a video camera for recording the user's performance. At least one of the user sub-station locations includes a communication device and a storage device in the form of a network router, a modem and server for interfacing with the workstations.

42 Claims, 7 Drawing Sheets

SYSTEM AND APPARATUS FOR A KARAOKE ENTERTAINMENT CENTER

FIELD OF THE INVENTION

The present invention relates to a system and apparatus for a Karaoke-type entertainment center. More particularly, this entertainment center includes a system and apparatus for transmitting and displaying music, text, and/or video for users to sing or act along with at the entertainment stage area within a karaoke player room.

BACKGROUND OF THE INVENTION

The phenomenon of karaoke entertainment in the United States and worldwide for users to listen or sing along with their favorite music is becoming a popular entertainment trend. Karaoke is making the user the singing star they have wanted to become by singing along with their favorite rock and roll, pop, alternative rock, country and western, folk, rhythm and blues and salsa songs. In karaoke, the user can have the same music playing in the background from their favorite song, while the user then sings the lyrics. Karaoke software allows users who do not know the words to the song, to sing along by scrolling the lyrics across the screen of a monitor. This allows the user to sing along (Karaoke) and to fulfill their dreams of being a star.

Karaoke is a Japanese abbreviated compound word: "kara" comes from "karappo" meaning empty, and "oke" is the abbreviation of "okesutura" or orchestra. Usually, a music disk consists of vocals and accompaniment; however, music disks in which only the accompaniment is recorded are called "Karaoke CD's or Karaoke Disks."

Karaoke started in Japan and has become very popular in the United States and around the world and is now available in almost every single language. The first format for Karaoke was actually on audio cassette tape, but that format was limited because it did not have any lyrics available for the singer except on printed sheet music.

The Karaoke industry is relatively new to the U.S., and owners and operators of karaoke entertainment centers are few in number. Most ofthe karaoke entertainment centers are small operations. The typical karaoke centers are owned by Asians and marketed for the Asian communities with limited English version videos. There are many Americans bars that have karaoke nights or special karaoke events. But there are no bars and entertainment clubs whose business is to offer karaoke every night.

In the early 1990's the Pioneer Corporation created 12" Karaoke Disks in laser format similar to the Laser Video disks for popular movies. The Laser format was very popular since the lyrics to the accompaniment music could be played on a TV screen in time with the music. This made it very easy for a Karaoke singer to "sing-along". In addition, the Laser format had the added feature of a background video and in many cases displayed images that complemented the style and mood ofthe song. All laser disk players would play the karaoke disks but not all laser disks had microphone inputs for mixing the singer and the accompaniment so Pioneer introduced special laser disk karaoke players. But the small production runs of Laser Karaoke players and Laser Karaoke disks made the laser disks format no longer predominate the Karaoke industry. Another competing Karaoke format was introduced at about the same time. CD plus graphics or CDG.

The 5" CDG format is very similar to the audio CD format in size and technology, except for one difference. CDG karaoke disks contain an additional track which first play the song lyrics in graphics on a TV and they are smaller and less expensive than laser disks. CDG Karaoke disks, however, have no moving picture video in the background. The words comprising the lyrics are typically displayed on a blue background and are highlighted in a contrasting color to signal when the words should be sung (The modem version of "following the bouncing ball"). The CDG format is the Karaoke standard today for most of the world's Karaoke.

As with the laser disks, the CDG karaoke disk requires a special Karaoke Player called a Karaoke CDG Player. The Karaoke CDG player is similar to a regular CD audio player except that it has a "G" chip for reading the graphics track. In addition, a CDG karaoke player also has microphone inputs and a key controller to adjust for the singer's key and an echo control to enhance the singer's voice.

Recently, another karaoke disk format has emerged called Video CD. This 5" disk format is not like CD Audio or CDG disks, except in size. Video CD is MPEG 2.0 format. Both of these formats are designed for motion picture displays but have been adapted for Karaoke. Video CD is most popular in Southeast Asia and in the United Kingdom, but is gaining on the CDG format in the United States. Like Laser Karaoke Disks, Video CD Karaoke disks provide not only the lyrics in time with the accompaniment, but also a video background display that complements the song. This format is very inexpensive with disks about half the price of CDG disks. However, what is needed to play video CD disks is either a CDG Karaoke player which has Video CD capabilities or a DVD player since all DVD players can play video CD format. Many CDG karaoke players are combination Video CD and CDG formats and operate the same way as a regular CDG Karaoke player.

DVD Karaoke disks were introduced in 1998. Most of the DVD karaoke disks are replications of the video CD karaoke disks or the older laser karaoke disks. The video background on a DVD karaoke disk is much higher than a video CD disk or Laser disk but to date there are no added music or sound quality or special DVD features. The DVD Karaoke disks tend to be higher priced and there is less of a selection of songs. A special DVD Karaoke Player is needed to mix the vocals and the accompaniment.

Currently, there are no bars, night clubs or entertainment clubs whose business is to provide and offer Karaoke every night to the non-Asian public in the United States. There remains a need for a system and apparatus for transmitting and displaying music audio and text for users to sing along with (karaoke) at an entertainment stage area within an individual karaoke player room. Further, the individual karaoke player room of this entertainment center will have T1 bandwidth technology to allow access to leased videos of popular songs. A special Compact Disc player (CDG player) having the ability to display graphics will be employed to display videos of popular songs on a large screen monitor. The rooms are available to rent by the hour so that customers can "Karaoke" (sing along) to their favorite song. Customers can then purchase videos or digital photos of their performances. Additionally, the entertainment center will carry the latest digital technology and data networks.

DESCRIPTION OF THE PRIOR ART

The only relevant prior art are existing karaoke-type entertainment centers located at various theme parks, such as Great Adventure, Disneyland and the like. However, none of these theme park karaoke-type entertainment centers includes the system and apparatus of a karaoke entertainment center having multiple private karaoke player rooms as claimed in the present invention. No relevant prior art patents were found for Karaoke-type entertainment centers.

Accordingly, it is an object of the present invention to provide a karaoke-type entertainment center that includes a system and apparatus for transmitting and displaying music audio, text and videos for users to sing along with (karaoke) or act at an entertainment stage area within an individual karaoke player room.

Another object of the present invention is to provide a karaoke-type entertainment center as a unique and premier place for family friendly entertainment where parents can go with their children, as a way to spend quality time in order to have clean and wholesome functions.

Another object of the present invention is to provide a karaoke-type entertainment center that has the latest digital technology and data networks in which customers can purchase videos or digital photos of their sing along performances.

Another object of the present invention is to provide a karaoke-type entertainment center that includes a plurality of private and individual karaoke player rooms, where these rooms are available to rent by the hour so that customers can sing along (karaoke) to their favorite songs, or act along to a favorite play or movie, or partake in interactive speeches by famous orators.

Another object of the present invention is to provide a karaoke-type entertainment center where its use of an individual and private karaoke player room give customers privacy with their close friends and family. Further, there are no host/hostess required to keep the group interested, such that the customers do not have to worry about performing in front of an unknown and/or large audience, which results in the users feeling comfortable and will have more opportunity to sing along (karaoke) to their favorite songs or act to their favorite plays or movies.

Another object of the present invention is to provide a karaoke-type entertainment center for corporate use by promoting the karaoke concept and karaoke rooms as a place to have group functions in order to promote team building and comraderie.

Another object of the present invention is to provide a karaoke-type entertainment center for inspiring musicians or actors to video tape themselves and their group where the video tape can be used as an audition tape, as the entertainment center is less expensive than a recording studio.

Another object of the present invention is to provide a karaoke-type entertainment center that includes T1 bandwidth technology to allow unlimited access to leased videos of current and popular songs or movies.

Another object of the present invention is to provide a karaoke-type entertainment center that includes the use of a novel compact disc player (CDG) having the ability to display visual graphics on a large screen monitor of music videos of current and popular songs, movies or plays as chosen by the users.

A further object of the present invention to provide a karaoke-type entertainment center that is user friendly, affordable by the consumer and economical in operation by the operator/owner.

SUMMARY OF THE INVENTION

In accordance with the present invention there is provided an entertainment system for storing, transmitting and displaying music, pictures and sound from videos and audios in any format for users to sing or act along with. The entertainment system includes an entertainment center having a central computer and server, a hardswitch connected to the central computer and server, and a converter connected to the hardswitch; and at least one user sub-station location having a plurality of individual karaoke player rooms. The entertainment system also includes a remote library source of videos/audios on any format having T1 bandwidth lines for transmitting to the entertainment center; and the entertainment center also having T1 bandwidth lines for transmitting to at least one of the user sub-stations locations. The converter includes a karaoke video disc player for converting the received video/audio into a desired karaoke formatted song. Each of the karaoke player rooms includes a workstation for selecting the desired karaoke formatted song or video, a viewing monitor for displaying the selected videos/audios in the converted karaoke formatted song, a karaoke microphone for the user to sing or act into, and a video camera for recording the user's performance. At least one of the user sub-station locations includes communication and storage means in the form of a network router, a modem and server for interfacing with the workstations. The central computer and server includes a karaoke software program for selecting, receiving and storing one of the videos/audios fro the remote library source; and the hardswitch includes an electronic interface device for interfacing and communicating with one or more of the workstations.

BRIEF DESCRIPTION OF THE DRAWINGS

Further objects, features, and advantages of the present invention will become apparent upon consideration of the detailed description of the presently-preferred embodiments, when taken in conjunction with the accompanying drawings wherein.

DETAILED DESCRIPTION OF THE PREFERRED EMBODIMENT

Figure 2:
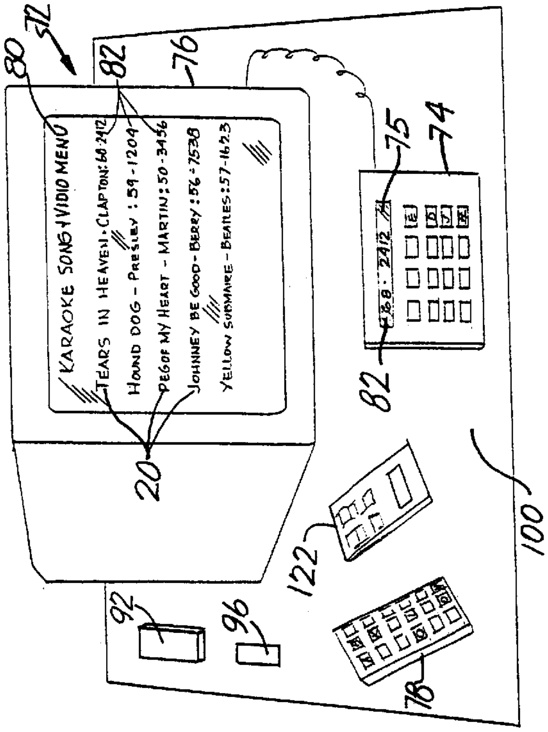
FIG. 2 is an enlarged perspective view of the karaoke-type entertainment center of the present invention showing the user interface system and its components in operational use.
Figure 3:
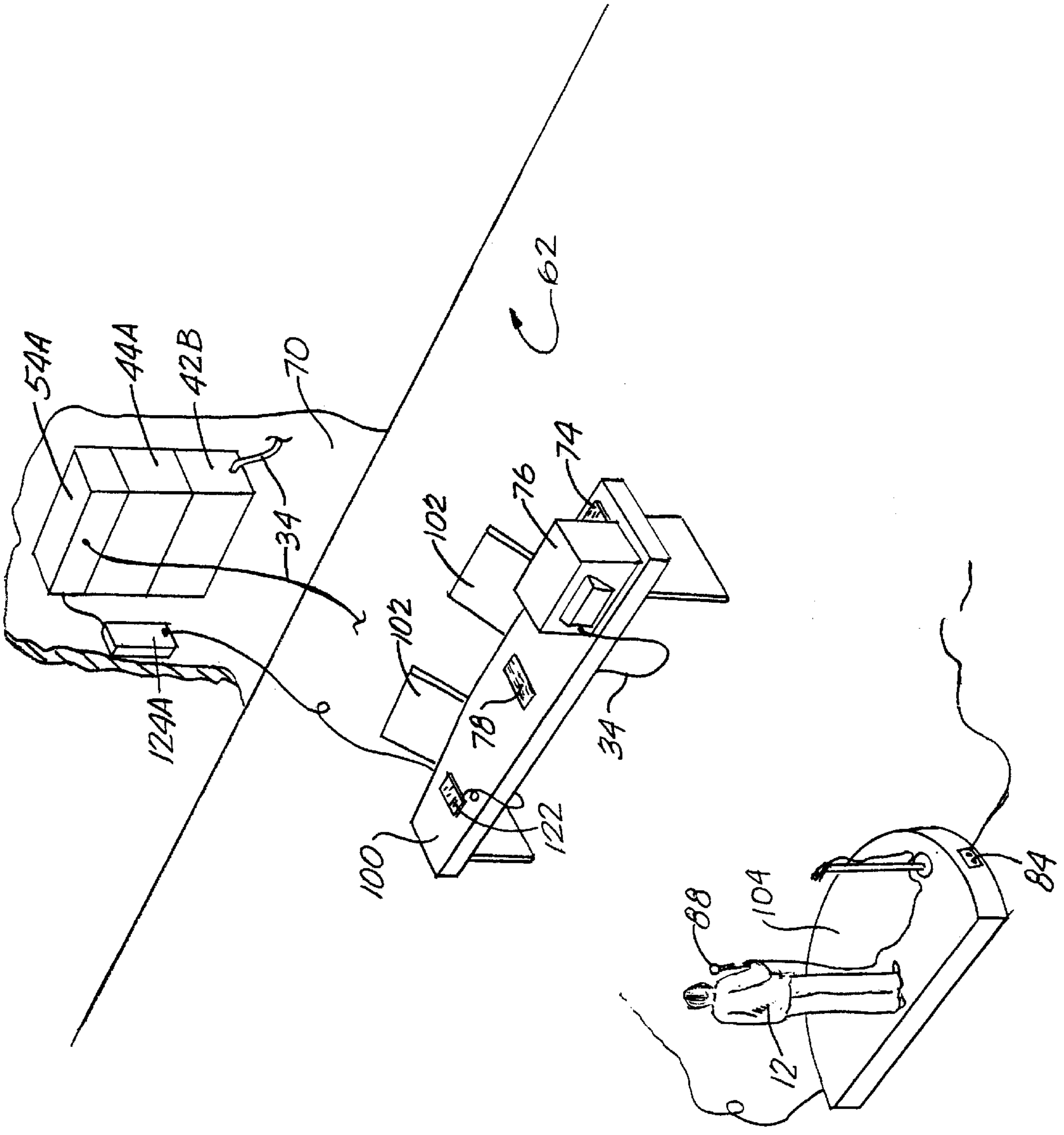
FIG. 3 is a rear perspective view of the karaoke-type entertainment center of the present invention showing the major components of the system and apparatus and in operation by a user.
Figure 4:
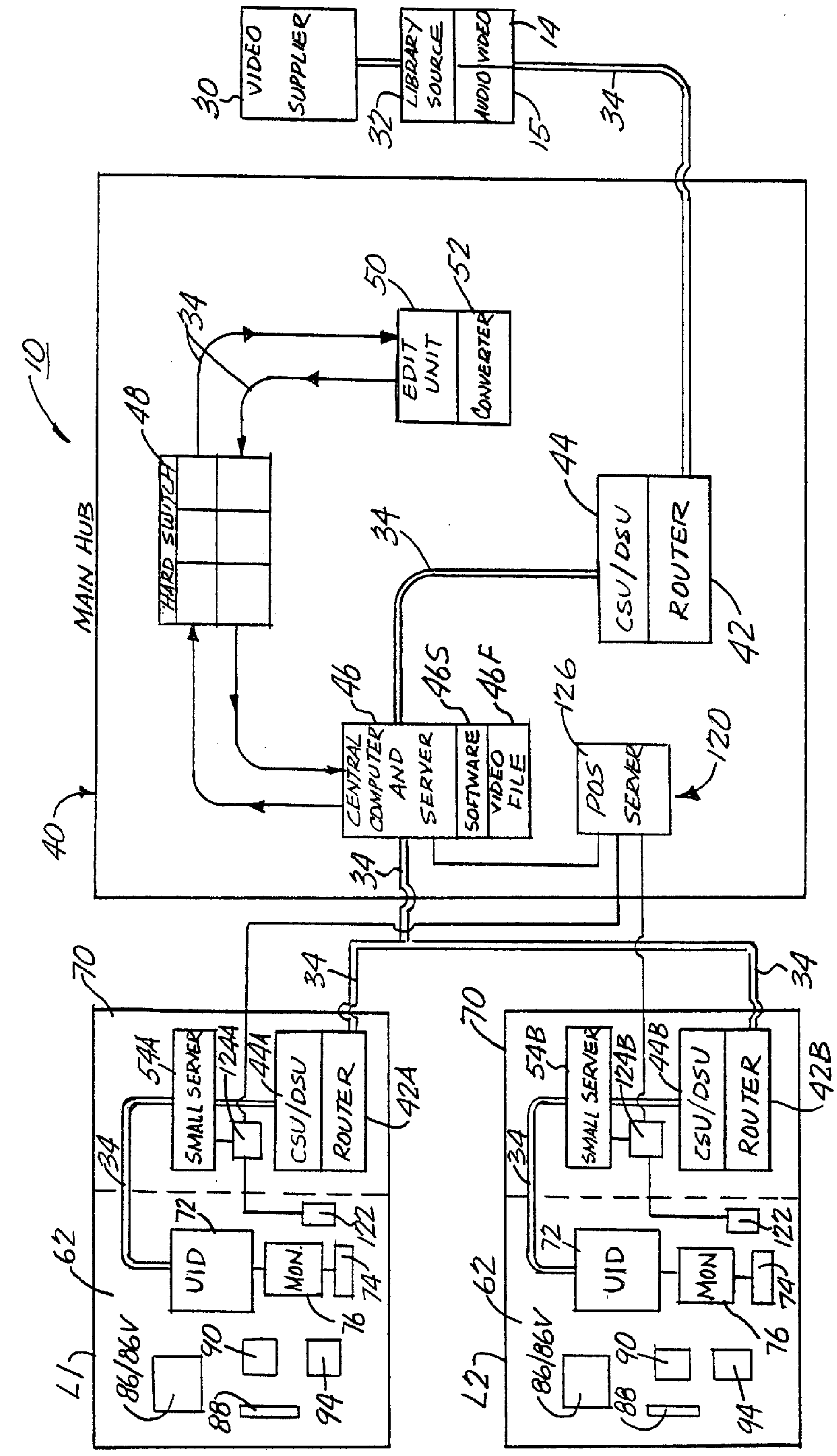
FIG. 4 is a flow chart of the karaoke-type entertainment center of the present invention showing the major components and the flow of the software routine for the operational use of the entertainment center.
Figure 5:
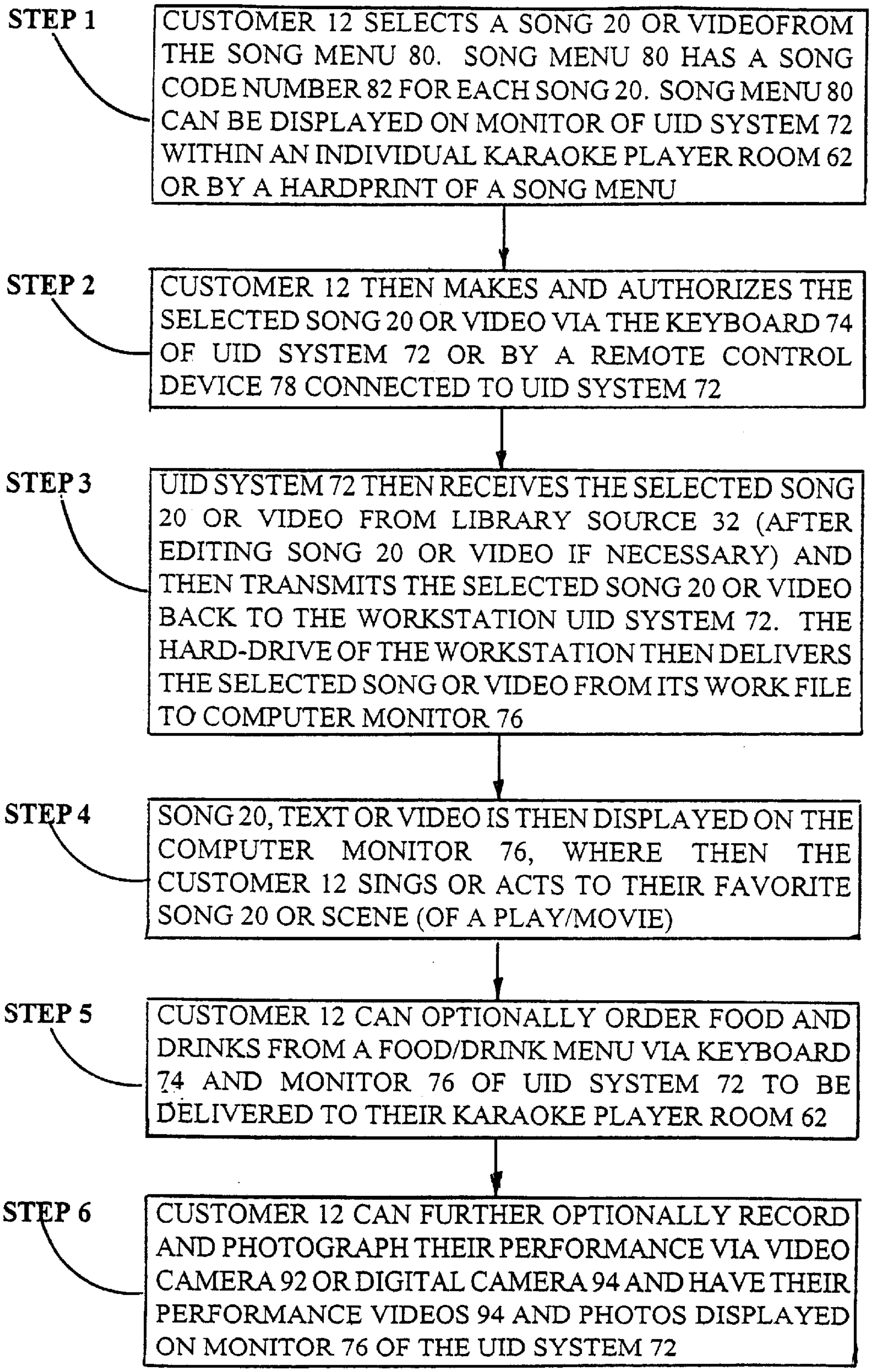
FIG. 5 is a functional flow chart of the karaoke-type entertainment center of the present invention showing the steps that are carried out for the software routine in selecting a song in a karaoke format by a user.
Figure 6:
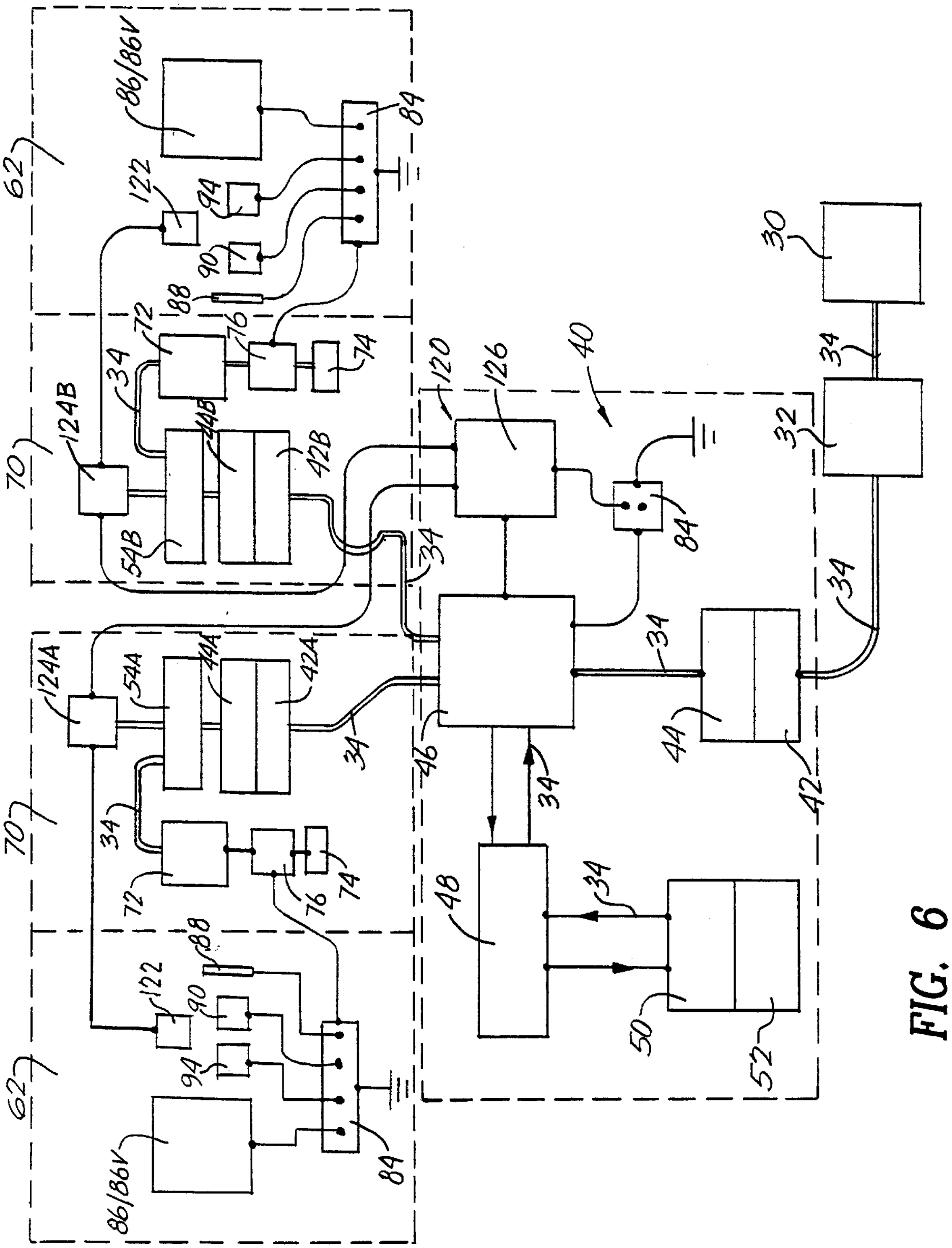
FIG. 6 is an electrical circuit schematic diagram of the karaoke-type entertainment center of the present invention showing the electrical circuit of the system and apparatus.

The entertainment system 10 and its component parts of the preferred embodiment of the present invention are represented in detail by FIGS. 1 through 8 of the patent drawings. The entertainment system 10 is used for transmitting and displaying audio music video 14/audio 15 and graphics 14G and text 16 for users 12 to sing along with (karaoke) at an entertainment center 40. The entertainment system 10, as shown in FIG. 4 includes a video supplier 30 having a library source 32 of videos 14 or audios 15 for transmitting a particular song 20, play or movie to a remote user system location 40, such as an entertainment center. The entertainment center (location) 40 includes an electronic routing device 42, a modem 44, a central computer/server 46, an electronic hardswitch device 48, an edit unit 50 and a converter 52, as shown in FIG. 3 of the drawings. The video supplier 30 and library source 32 is electronically linked and connected to the routing device 42, modem 44, computer/server 46 via a T1 bandwidth line 34. The T1 bandwidth line 34 allows the central computer/server 46 to access and transmit a particular song(s) 20, movies or plays from the library source 32 via the video supplier 30, as shown in FIG. 4 of the drawings. Videos 14 and audios 15 are defined to include pictures and sound from any formatted source including video tapes, audio tapes, CD's, DVD's and the like.

Electronic routing device (router) 42 is used for determining the network point where a song, information package, a play, a speech should be forwarded to. Modem 44 is a carrier sensing unit in combination with a digital service unit (CSU/DSU). Modem 44 is used for picking-up the electronic signal from the router 42 and transforming the electronic signal to a digital format, and connecting the digital signal to the central computer/server 46 in order to process the incoming datum 20 (i.e. songs, plays, etc.) via the T1 bandwidth line 34.

Central computer/server 46 further includes a karaoke software program 46S and a karaoke song storage file 46F. Central computer/server 46 is used for selecting, receiving and storing one of the remote videos 14 or audios via software program 46S. The central computer/server 46 stores the karaoke videos 14 or audios 15 of a given song 20 upon receipt from the video suppler 30. Each video 14 or audio 15 is saved as a file 46F in central computer/server 46, a typical karaoke video file 46F is about 50 megabytes. It will take 1 to 2 minutes to download one video file 46F from the video supplier 30/library source 32 via the T1 bandwidth line component 34. As a result, the central computer/server 46 downloads new video files 46F into the karaoke software database 46S from the video supplier 30 once a day, before or after operation of entertainment center 40. Also, the customized computer software program system 46S is able to play any karaoke format 18, such that the video 14 or audio 15 of a given song 20 is distributed to one or more individual karaoke player rooms 62 on demand.

The electronic hardswitch device 48 is used for communicating and interfacing the data 20 (i.e. songs, speeches, etc.) from the central computer/server 46 in order to communicate that data 20 with the editing unit 50 and converter 52 which then further processes that data 22. Hardswitch device 48 having multiple electronic interface units 48*iu* is also used to communicate with the multiple workstations/user interface devices (UID) 72 within each ofthe karaoke playerrooms 62 via central computer/server 46. The workstations or UID's 72 are also connected by the T1 bandwidth line 34 with central computer/server 46.

Edit unit 50 is a workstation computer and monitor in which an operator/employee of the entertainment center 40 edits each of the songs 20, plays or movies from the video supplier 30. Each song 20, movie or play is edited for lewdness, sexual content, foul language, nudity and the like in order to make that particular song 20, play or movie family friendly. The edited song 20, play or movie is then communicated to converter 52. Converter 52 or video disc player converts the electronic signal via the T1 bandwidth line 34 into the karaoke format 18 of song 20. Video disc player 52 is used for converting and transforming the received video 14 or audio 15 of a given song 20 into the desired karaoke format 18. Karaoke format 18 is defined as an audio music video 14 or audio (only) 15 with graphics 14G and/or text 16 of a given song 20 for users 12 to sing or act along within one of the individual karaoke players rooms 62 at the entertainment center 40.

Figure 7:
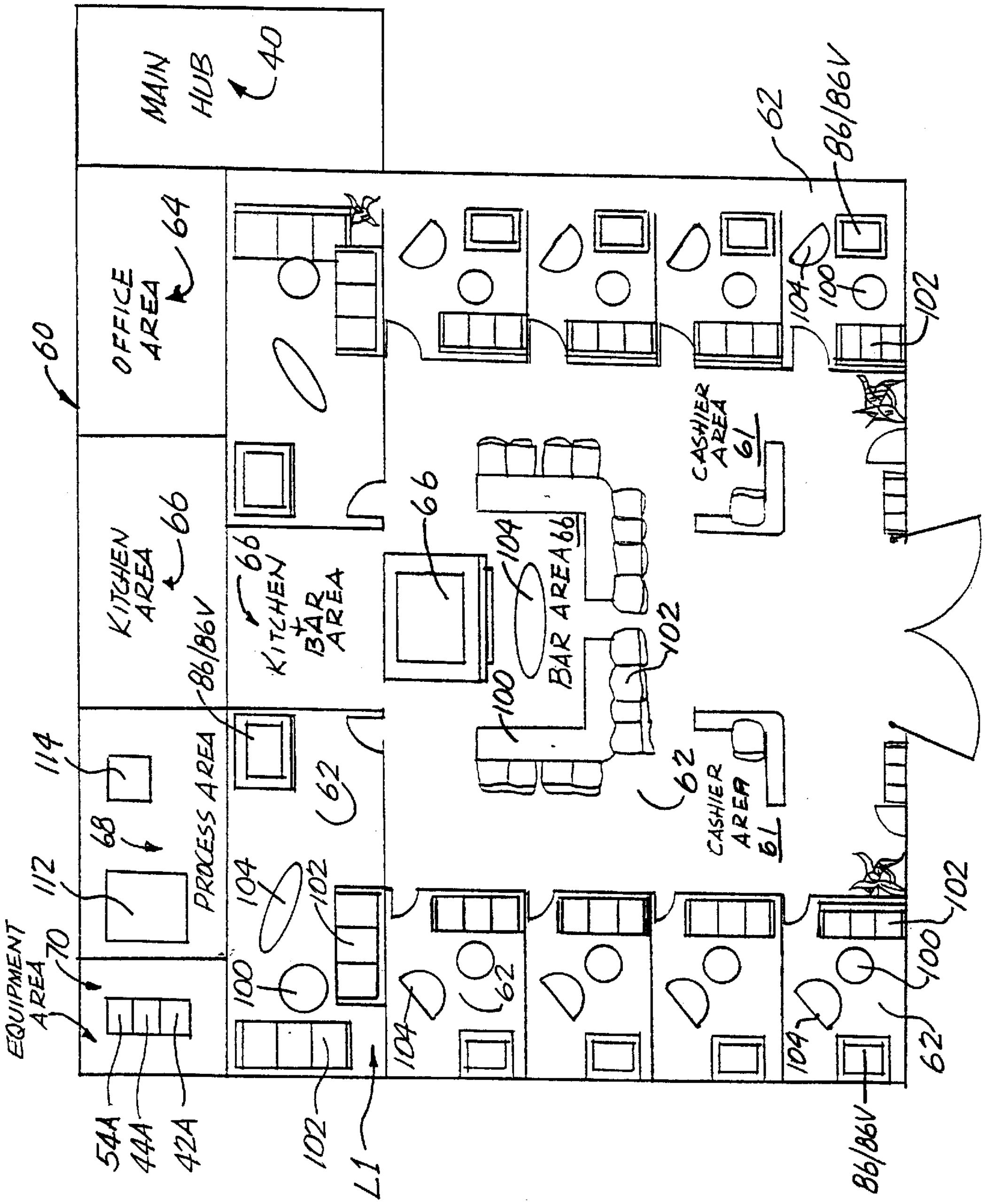
FIG. 7 is a schematic floor plan layout of the karaoke-type entertainment center of the present invention showing the building floor plan having a main hub area, a plurality of individual karaoke player rooms, a cashier area/office area, a kitchen area and a video and photograph process area.

The remote user system location or entertainment center 40 (or main hub) of entertainment system 10 is housed in a recreational facility or building 60 having one or more rooms for use in conducting the operation of the karaoke entertainment system 10. Entertainment center 40 may be situated at a given location within building 60 having sub-station L1 as part of building 60. Building 60, as shown in FIG. 7 ofthe drawings, includes a plurality of individual karaoke player rooms 62 for customer use in performing the karaoke sing or act along performances by the customers 12. Building 60 also includes a cashier area 61 for calculating sales based upon room 62 usage, an office area 64, and a kitchen area 66 for serving and preparing food and drinks in which to serve customers 12 within room 62, and a process area 68 for developing and processing customer performance video tapes 92 or performance photos (pictures) 96. Process area 68 includes a video tape reproduction apparatus 112 and a photograph reproduction apparatus 114, where each of these apparatus 112 and 114 are electronically connected to the central computer and server, for saving the customer performance videos 92 or performance photos 96 for a period of time.

Figure 8:
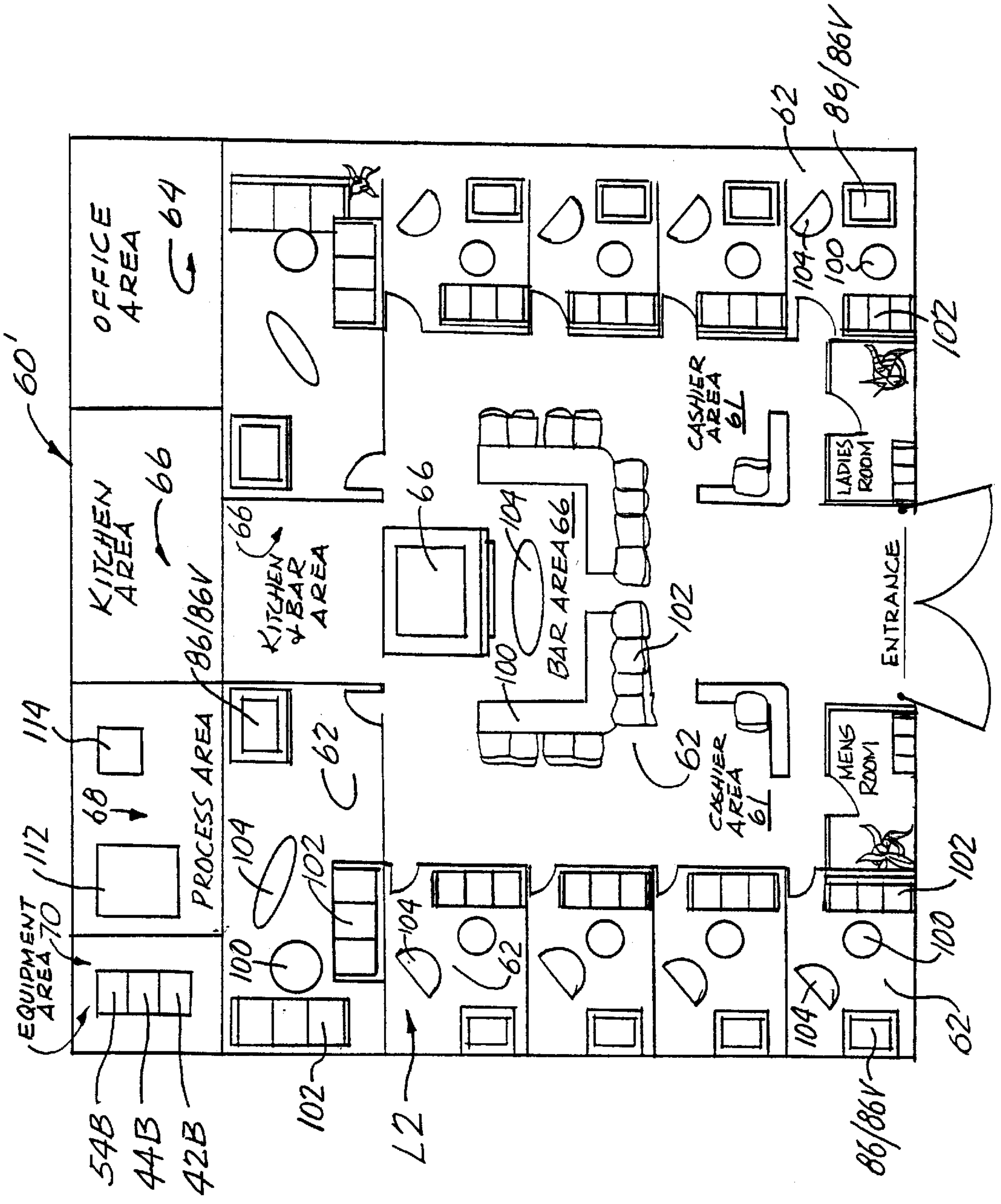
FIG. 8 is a schematic floor plan layout of the karaoke-type entertainment center of the present invention showing the building floor plan having a plurality of individual karaoke player rooms; a cashier area/office area, a kitchen area and a video and photograph process area.

Optionally, the entertainment center 40 or main hub may be at a remote location, not in the same vicinity of building 60, but electronically connected to a sub-station L2, as shown in FIGS. 4 and 8 ofthe drawings. Sub-station L2 includes a recreational facility or building 60' having the same plurality of player rooms 62, a cashier area/office area 64, a kitchen/bar area 66, and a process area 68 but not having a main hub 40 within building 60'.

At each sub-station location L1 and L2 further includes, as shown in FIG. 4 of the drawings, an additional routing device 42A and 42B, a modem (CSU/DSU device) 44A and 44B and a second (smaller capacity) server 54A and 54B, respectively, for use with each of the player rooms 62 at each of the sub-station locations L1 and L2. This electronic communication equipment 42A, 44A and 54A for sub-station location L1 and 42B, 44B and 54B for sub-station L2 in housed in a separate equipment area 70 in common or adjacent to the plurality of individual karaoke player rooms 62 within building 60 and 60', respectively. Equipment area 70 would be housed within the same vicinity or adjacent to main hub area/user system location 40, as shown in FIGS. 4, 7 and 8 of the drawings.

Figure 1:
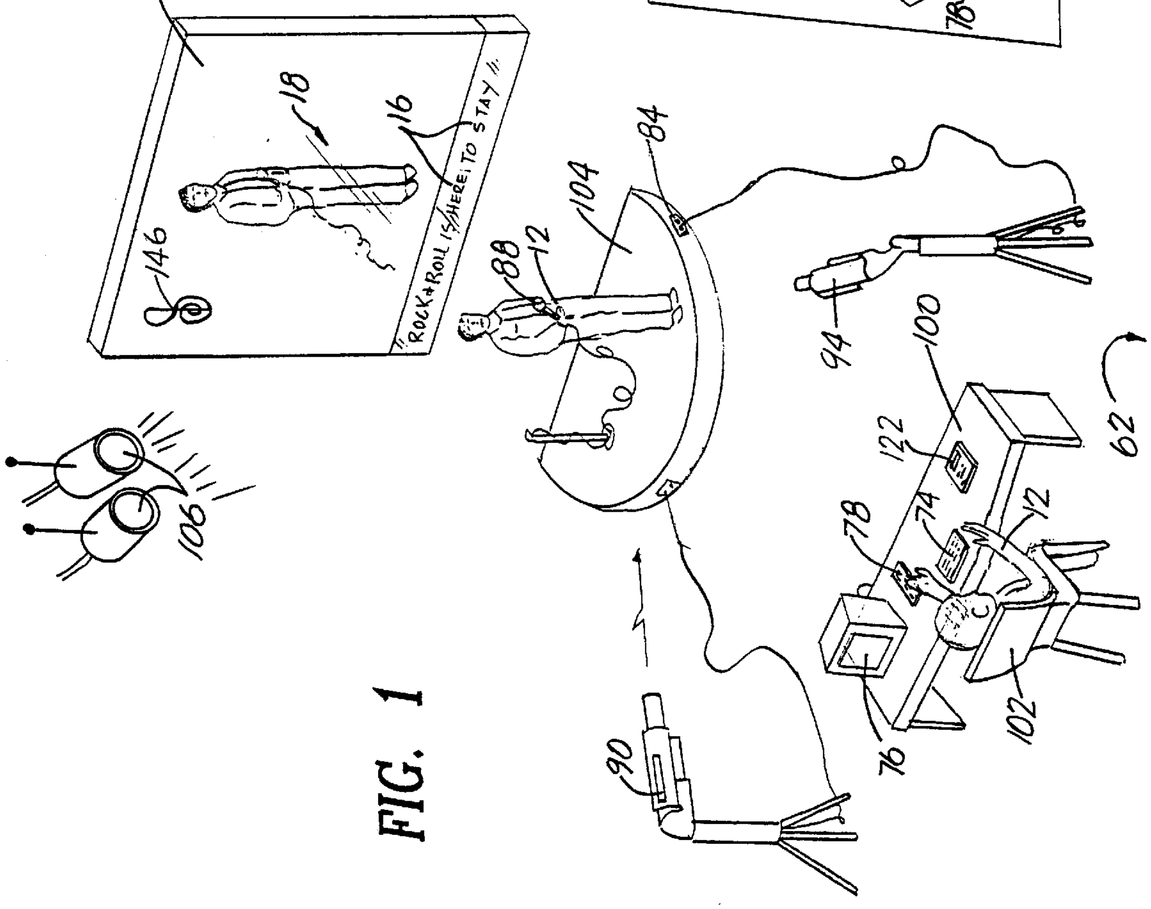
FIG. 1 is a front perspective view of the karaoke-type entertainment center of the preferred embodiment ofthe present invention showing the major components of the system and apparatus and in operation by a user.

Each player room 62 includes, as shown in FIGS. 1, 2 and 3 of the drawings, a user interface device (UID)/system 72 being a workstation unit within each of the player rooms within building 60 or 60'. The interface system 72 includes a modified keyboard 74 having a display screen 75 therein, a monitor 76, and a remote control device 78. Each player room 62 also includes the T1 bandwidth component 34 for accessing and transmitting a particular song 20 or video from the library source 34 and the video supplier 30 via the entertainment center 40. The modified keyboard 74 and/or the remote control device 78 is used to access and display the information needed, such as choosing a particular song 20 or video on monitor 76 from a song, movie or play menu 80. The customers 12 use the customized interface system 72 or remote control device 78 to select their favorite song 20 or movie via central computer/server 46. Each song 20, play or movie will have a designated song, move or play code 82 so the user 12 can request their song 20, movie or play from the menu 80. For example, the menu 80 may assign a code 82 of 68-2412 for "Tears in Heaven" by Eric Clapton. To request "Tears in Heaven" the customer presses 682412 into the modified keyboard 74 having a display screen 75 of user interface system 72 and then presses "Enter" on keyboard 74 to make the request. The customer 12 can optionally request the songs 20 with the remote control device 78 or by manually entering that number into the display screen 75 of user interface system 72 via keyboard 74.

Each ofthe individual karaoke player rooms 62 further includes power supply outlets 84, a viewing monitor 86 and/or large TV screen 86V for displaying the received videos 14 or audios 15 of a particular song 20 in the converted karaoke format 18, a karaoke microphone 88 for the user 12 to sing into, and a video camera 90 for recording the user's performance into a performance video 92. The karaoke player room 22 additionally includes a digital camera 94 to take candid pictures 96 of the user's performance while singing into the microphone 88. The video 14 or audio 15 of song 20 will be played on the viewing monitor 86 or TV screen 86V that is situated in each karaoke room 62. Customers 12 could also optionally view the user's singing performance video tape 92 or the live on-stage performance of the user singing on monitor 76 of the user interface system 72. The video 14 or audio 15 of songs 20 can also be distributed to the other player rooms 62 on demand.

Additionally, each of the player rooms 62 include one or more tables 100 and chairs 102 for customer seating, and a stage area 104 having a plurality of overhead/stage lighting fixtures 106 for use when the user 12 is singing and performing a particular song 20 in the karaoke format 18, as shown in FIGS. 1 and 2 of the drawings.

Operation of the Present Invention

The karaoke video supplier 30 provides videos from a library source 32 that is transmitted in both video 14 and audio 15 format for a given song 20, play or movie. In addition, in order to get the latest songs 20, videos or plays, entertainment companies would provide songs 20 in audio 15 format or both video 14 and audio 15 format. The supplier 30 then transmits the video 15 or audio 14 via a T1 line 34 to the entertainment center 40. The center 40 has a central computer 46 and special video players 52 which convert the signals into Karaoke format 18.

The central computer/server 46 receive and stores the karaoke videos/audios 14 or 15 upon receipt from the supplier 30. The related karaoke video 14 or audio 15 is displayed on a computer monitor 86 or TV screen 86V that is situated in each karaoke room 62. Each video 14 or audio 15 is saved as a file 46F on the central computer/server 46. The video 14 or audio 15 of a given song 20 is distributed to the respective room 62 on demand. A typical karaoke video file 46F is about 50 megabytes. The customized computer software system 46S would be able to play any karaoke format 18.

In each player room 62, as shown in FIGS. 1 through 3, there is a large screen monitor 86 or TV screen 86V on which the karaoke videos/audios 14 and 15 are displayed; a video camera 90 with monitor 76 for customers 12 to see themselves on a performance video 92 and to record customer performances; and a user interface system 72 for the customer 12 to order their performance videos 50. Optionally, the customers 12 would be able to take candid pictures 96 of the user's performance while singing or acting with the digital camera 94.

Depending on the video 14 or audio 15 of a given song 20, the customers 12 will see either text 16 or text 16 and image 14G in a background. For songs 20, plays or movies in which the company has the right to convert into karaoke format 18, text 16 and some customized background 14G will be displayed. The customers can choose to purchase a video 92 of themselves performing. The video cassette 92 will be 60 minutes. There is a customized user interface system 72 for the customer 12 to choose their songs 20. Each song 20 will have a design code 82 in which the user 12 can request their song from a menu 80.

As for methods of payment, as shown in FIGS. 7 and 8, there will be a customized point of sale system (POS) 120 at the cashier area 61 that calculates sales based on the time a room 62 is occupied; sales for drinks and food ordered by customers 12 in the individual karaoke played room 62 from the kitchen area 66; for sales of performance videos 92 and pictures 96 being purchased showing performances of customers 12 from process area 68. Customers 12 can pay for the player rooms 62 after use either by cash or credit card. Point of sale system 120 includes multiple front end POS units 122 within each cashier area 61 for recording user time usage of room 62, sales of food and drinks, as well as sales for performance videos 92 and photos 96. Each of the front end POS units 122 are connected to a substation POS server 124A and 124B for storing the sales data from each player room 62. Each of the substation POS servers 124 are electronically to a main POS server 126 for enabling the entertainment center 40 to measure the overall financial performance of each substation L1 and L2 locations of entertainment system 10. Each substation POS server 124A and 124B is also electronically connected to the substation server 54A and 54B, respectively, for measuring the financial/sales data for that particular substation L1 and L2 locations, respectively. Main POS server 126 is electronically connected to the central computer and server 46 for further analysis of the financial sales data of the entertainment center 40.

ADVANTAGES OF THE PRESENT INVENTION

Accordingly, an advantage of the present invention is that it provides for a karaoke-type entertainment center that includes a system and apparatus for transmitting and displaying music audio, text and videos for users to sing along with (karaoke) or act at an entertainment stage area within an individual karaoke player room.

Another advantage of the present invention is that it provides for a karaoke-type entertainment center as a unique and premier place for family friendly entertainment where parents can go with their children, as a way to spend quality time in order to have clean and wholesome functions.

Another advantage of the present invention is that it provides for a karaoke-type entertainment center that has the latest digital technology and data networks in which customers can purchase videos or digital photos of their sing or act along performances.

Another advantage of the present invention is that it provides for a karaoke-type entertainment center that includes a plurality of private and individual karaoke player rooms, where these rooms are available to rent by the hour so that customers can sing along (karaoke) to their favorite songs, or act along to a favorite play or movie, or partake in interactive speeches by famous orators.

Another advantage of the present invention is that it provides for a karaoke-type entertainment center where its use of an individual and private karaoke player room give customers privacy with their close friends and family. Further, there are no host/hostess required to keep the group interested, such that the customers do not have to worry about performing in front of an unknown and/or large audience, which results in the users feeling comfortable and will have more opportunity to sing along (karaoke) to their favorite songs or act to their favorite plays or movies.

Another advantage of the present invention is that it provides for a karaoke-type entertainment center for corporate use by promoting the karaoke concept and karaoke rooms as a place to have group functions in order to promote team building and comraderie.

Another advantage of the present invention is that it provides for a karaoke-type entertainment center for inspiring musicians or actors to video tape themselves and their group where the video tape can be used as an audition tape, as the entertainment center is less expensive than a recording studio.

Another advantage of the present invention is that it provides for a karaoke-type entertainment center that includes T1 bandwidth technology to allow unlimited access to leased videos of current and popular songs or movies.

Another advantage of the present invention is that it provides for a karaoke-type entertainment center that includes the use of a novel compact disc player (CDG) having the ability to display visual graphics on a large screen monitor of music videos of current and popular songs, movies or plays as chosen by the users.

A further advantage of the present invention is that it provides for a karaoke-type entertainment center that is user friendly, affordable by the consumer and economical in operation by the operator/owner.

A latitude of modification, change, and substitution is intended in the foregoing disclosure, and in some instances, some features of the invention will be employed without a corresponding use of other features. Accordingly, it is appropriate that the appended claims be construed broadly and in a manner consistent with the spirit and scope of the invention herein.

What is claimed is:

1. An entertainment system for storing, transmitting and displaying music, pictures and sound from videos and audios in any format for users to sing or act along with, comprising:

a) an entertainment center including a central computer and server, a hardswitch connected to said central computer and server, and a converter connected to said hardswitch;

b) at least one user sub-station location having a plurality of individual karaoke player rooms;

c) a remote library source of videos/audios on any format having first means for transmitting said videos/audios to said entertainment center; and said entertainment center having second means for transmitting said videos/audios to at least one of said user substations locations;

d) said converter including means for converting said videos/audios into a desired karaoke formatted song;

e) each of said karaoke player rooms including a workstation for selecting said desired karaoke formatted song or video, a viewing monitor for displaying the selected videos/audios in said converted karaoke formatted song, a karaoke microphone for the user to sing or act into, and a video camera for recording the user's performance;

f) at least one of said user sub-station locations including communication and storage means therein for interfacing with said workstations; and g) said central computer and server including means for selecting, receiving and storing one of the videos/audios from said remote library source; and said hardswitch including means for interfacing and communicating with one or more of said workstations.

2. An entertainment system in accordance with claim 1, wherein said means for selecting, receiving and storing one of said videos/audios includes a software program for operating said entertainment center.

3. An entertainment system in accordance with claim 1, wherein said means for interfacing and communicating with one or more of said workstations includes an electronic communication interface device having multiple electronic interface units for transmitting the selected videos/audios from said central computer and server to said converter and to said remote user sub-station locations.

4. An entertainment system in accordance with claim 1, wherein said means for converting said received video/audio includes a karaoke video disc player for converting and displaying said received video/audio in said desired karaoke formatted song.

5. An entertainment system in accordance with claim 1, wherein said first means for transmitting to said entertainment center includes T1 bandwidth lines connected from said library source to said central computer and server for accessing and transmitting the selected video/audio from said remote library source.

6. An entertainment system in accordance with claim 5, further including a first network router connected to said central computer and server via said T1 bandwidth line for routing where the selected video/audio is to be routed to; wherein the selected video/audio is then routed and electronically forwarded to said central computer and server.

7. An entertainment system in accordance with claim 5, further including a first modem which is a carrier sensing unit in combination with a digital service unit (CSU/DSU) for receiving the electronic signal from said first network router via said T1 bandwidth line and transforming the electronic signal to a digital format, and then connecting the digital signal to said central computer and server.

8. An entertainment system in accordance with claim 5, wherein said communication and storage means at said user sub-station location includes a sub-station network router connected to a sub-station modem via said T1 bandwidth line for routing where the selected video/audio is to be routed to; wherein the selected video/audio is then routed and electronically forwarded to said sub-station modem.

9. An entertainment system in accordance with claim 8, wherein said communication and storage means at said user sub-station location includes said sub-station modem which is a carrier sensing unit in combination with a digital service unit (CSU/DSU) for receiving the electronic signal from said sub-station network router via said T1 bandwidth line and transforming the electronic signal to a digital format, and then connecting the digital signal to a sub-station server.

10. An entertainment system in accordance with claim 9, wherein said communication and storage means at said user sub-station location includes said sub-station server for interfacing with one or more of said workstations at said user sub-station location.

11. An entertainment system in accordance with claim 10, wherein each of said workstations includes an interface system for making a selection of the desired karaoke formatted song from said sub-station server by a user.

12. An entertainment system in accordance with claim 11, wherein said interface system includes a numbered keyboard and digital screen for the user to select the karaoke formatted song, movie or play.

13. An entertainment system in accordance with claim 11, wherein said interface system further includes a remote control device in order for the user to select a song, play or movie from a formatted karaoke menu.

14. An entertainment system in accordance with claim 11, wherein said interface system includes a computer monitor for viewing the user's performance, or viewing said karaoke menu.

15. An entertainment system in accordance with claim 1, wherein said karaoke player rooms further include a digital camera for taking photographs of the user's performance.

16. An entertainment system in accordance with claim 1, wherein said second means for transmitting to at least one of said user sub-station locations includes T1 bandwidth lines connected from said entertainment center to said workstations for accessing and transmitting the selected video/audio from said remote library source.

17. An entertainment system in accordance with claim 1, wherein said viewing monitor in said karaoke player room is a TV screen, a DVD screen, or a projector screen.

18. An entertainment system in accordance with claim 1, wherein said converter further includes an editing unit to edit each of the received videos/audios from said remote library source to remove lewdness, sexual content, foul language and nudity.

19. An entertainment system in accordance with claim 1, wherein said entertainment center further includes means for processing and producing customer performance video tapes and performance photos.

20. An entertainment system in accordance with claim 19, wherein said means for processing and producing customer performance video tapes and performance photos includes a video tape reproduction apparatus and a photograph reproduction apparatus.

21. An entertainment system for storing, transmitting and displaying music, pictures and sound from videos and audios in any format for users sing or act along with, comprising;

a) an entertainment center including a network router, a modem connected to said network router, said modem connected to a central computer and server, said central computer and server connected to a hardswitch, said hardswitch connected to an editing unit and said editing unit connected to a converter, b) at least one user sub-station location having a plurality of individual karaoke player rooms;

c) a remote library source of videos/audios on any format having first means for transmitting said videos/audios to said entertainment center; and said entertainment center having second means for transmitting said videos/audios to at least one of said user sub-station locations;

d) said converter including means for converting said videos/audios into a desired karaoke formatted song, play or movie;

e) each of said karaoke player rooms including a workstation for selecting said desired karaoke formatted song, play or movie, a viewing monitor for displaying the selected videos/audios in said converted karaoke formatted song, a karaoke microphone for the user to sing or act into, and a video camera for recording the user's performance;

f) at least one of said user sub-station locations including communication and storage means therein for interfacing with said workstations; and g) said central computer and server including means for selecting, receiving and storing one of the videos/audios from said remote library source; and said hardswitch including means for interfacing and communicating with one or more said workstations.

22. An entertainment system in accordance with claim 21, wherein said means for selecting, receiving and storing one of said videos/audios includes a software program for operating said entertainment center.

23. An entertainment system in accordance with claim 21, wherein said means for interfacing and communicating with one or more of said workstations includes an electronic communication interface device having multiple electronic interface units for transmitting the selected videos/audios from said central computer and server to said converter and to said remote user sub-station locations.

24. An entertainment system in accordance with claim 21, wherein said means for converting said received video/audio includes a karaoke video disc player for converting and displaying said received video/audio in said desired karaoke formatted song, play or movie.

25. An entertainment system in accordance with claim 21, wherein said first means for transmitting to said entertainment center includes T1 bandwidth lines connected from said library source to said central computer and server for accessing and transmitting the selected video/audio from said remote library source.

26. An entertainment system in accordance with claim 25, further including a network router connected to said central computer and server via said T1 bandwidth line for routing where the selected video/audio is to be routed to; wherein the selected video/audio is then routed and electronically forwarded to said central computer and server.

27. An entertainment system in accordance with claim 25, further including a modem which is a carrier sensing unit in combination with a digital service unit (CSU/DSU) for receiving the electronic signal from said network router via said T1 bandwidth line and transforming the electronic signal to a digital format, and then connecting the digital signal to said central computer and server.

28. An entertainment system in accordance with claim 21, wherein said second means for transmitting to at least one of said user sub-stations includes T1 bandwidth lines connected from said entertainment center to said workstation for accessing and transmitting the selected video/audio from said remote library source.

29. An entertainment system in accordance with claim 21, wherein said communication and storage means at said user sub-station location includes a sub-station network router connector to a sub-station modem via said T1 bandwidth line for routing where the selected video/audio is to be routed to; wherein the selected video/audio is then routed and electronically forwarded to said sub-station modem.

30. An entertainment system in accordance with claim 29, wherein said communication and storage means at said user sub-station location includes said sub-station modem which is a carrier sensing unit in combination with a digital service unit (CSU/DSU) for receiving the electronic signal from said sub-station network router via said T1 bandwidth line and transforming the electronic signal to a digital format, and then connecting the digital signal to a sub-station server.

31. An entertainment system in accordance with claim 30, wherein said communication and storage means at said user sub-station location includes said sub-station server for interfacing with one or more of said workstations at said user sub-station location.

32. An entertainment system in accordance with claim 31, wherein each of said workstations include an interface system for making a selection of the desired karaoke formatted song, play or movie from said sub-station server by a user.

33. An entertainment system in accordance with claim 32, wherein said interface system includes a numbered keyboard and digital screen for the user to select the formatted song, play or movie.

34. An entertainment system in accordance with claim 32, wherein said interface system further includes a remote control device in order for the user to select a formatted song, play or movie from a formatted karaoke menu.

35. An entertainment system in accordance with claim 32, wherein said interface system includes a computer monitor for viewing the user's performance, or viewing said karaoke menu.

36. An entertainment system in accordance with claim 21, wherein said karaoke player rooms further include a digital camera for taking photographs of the user's performance.

37. An entertainment system in accordance with claim 21, wherein said viewing monitor in said karaoke player room is a TV screen, a DVD screen, or a projector screen.

38. An entertainment system in accordance with claim 21, wherein said editing unit is used to edit each of the received videos/audios from said remote library source to remove lewdness, sexual content, foul language and nudity.

39. An entertainment system in accordance with claim 21, wherein said entertainment center further includes means for processing and producing customer performance video tapes and performance photos.

40. An entertainment system in accordance with claim 39, wherein said means for processing and producing customer performance video tapes and performance photos includes a video tape reproduction apparatus and a photograph reproduction apparatus.

41. An entertainment system in accordance with claim 21, wherein said entertainment system further includes a point of sale system for recording, storing and analyzing the sales data for each of said individual karaoke player rooms.

42. An entertainment system in accordance with claim 41, wherein said point of sale system includes a plurality of front end point of sale units for recording the actual sales of each of said individual karaoke player rooms with a given user substation, a substation point of sale server electronically connected to each of said front end point of sale units for recording the actual sales of a given user substation and a main point of sale server electronically connected to each of said substation point of sale servers for recording the total sales of said one or more user substations of said entertainment center.

* * * * *